(12) United States Patent  (10) Patent No.: US 7,954,981 B2
Bjerre  (45) Date of Patent: Jun. 7, 2011

(54) LIGHT SOURCE MODULE FOR A LIGHT FIXTURE

(75) Inventor: Flemming Freese Bjerre, Aarhus C (DK)

(73) Assignee: Martin Professional A/S, Aarhus N (DK)

( * ) Notice: Subject to any disclaimer, the term of this patent is extended or adjusted under 35 U.S.C. 154(b) by 374 days.

(21) Appl. No.: 12/136,365

(22) Filed: Jun. 10, 2008

(65) Prior Publication Data

US 2009/0303724 A1  Dec. 10, 2009

(51) Int. Cl.
*F21V 29/02* (2006.01)
*F21V 7/20* (2006.01)

(52) U.S. Cl. .................... 362/294; 362/345; 362/373
(58) Field of Classification Search .......... 362/264, 362/294, 345, 373, 218; 353/61
See application file for complete search history.

(56) References Cited

U.S. PATENT DOCUMENTS

| | | | |
|---|---|---|---|
| 2,395,561 A * | 2/1946 | Osterberg et al. | 353/61 |
| 3,766,377 A | 10/1973 | Junginger | |
| 3,806,236 A | 4/1974 | Downing | |
| 5,207,747 A | 5/1993 | Gordin et al. | |
| 5,313,378 A | 5/1994 | Gordin et al. | |
| 5,515,245 A | 5/1996 | Bobcza et al. | |
| 5,626,416 A | 5/1997 | Romano et al. | |
| 6,481,854 B1 * | 11/2002 | Sugawara et al. | 353/61 |
| 6,578,991 B2 | 6/2003 | Beaumont | |
| 6,913,361 B2 * | 7/2005 | Gishi et al. | 353/58 |
| 7,083,286 B2 * | 8/2006 | Kim et al. | 353/61 |
| 7,175,317 B2 | 2/2007 | Beaumont | |
| 7,210,825 B2 * | 5/2007 | Watanabe et al. | 362/373 |
| 7,559,676 B2 * | 7/2009 | Rasmussen et al. | 362/264 |
| 7,607,781 B2 * | 10/2009 | Yun et al. | 353/55 |
| 7,748,850 B2 * | 7/2010 | Lin et al. | 353/57 |
| 2002/0129262 A1 | 9/2002 | Kutaragi et al. | |
| 2004/0263799 A1 * | 12/2004 | Lim | 353/61 |
| 2008/0089066 A1 | 4/2008 | Rasmussen et al. | |

FOREIGN PATENT DOCUMENTS

| | | |
|---|---|---|
| DE | 8620 537.4 U1 | 10/1986 |
| GB | 1371567 | 10/1974 |
| GB | 2 068 524 A | 8/1981 |
| GB | 2 317 003 A | 3/1998 |
| JP | 9-106076 A | 4/1997 |
| JP | 2000-352762 A | 12/2000 |
| WO | 2005/095853 A1 | 10/2005 |

OTHER PUBLICATIONS

European Search Report of Application No. EP 08 10 4332 Dated Oct. 28, 2008.

* cited by examiner

*Primary Examiner* — Alan Cariaso
(74) *Attorney, Agent, or Firm* — Roberts Mlotkowski Safran & Cole, P.C.; David S. Safran

(57) ABSTRACT

A method for generating an air stream for cooling a light source, and a light source module for a light fixture with a blower for cooling the light source and the light source base. To achieve highly effective cooling of a lamp in a light fixture or a projector at least one forced air stream is generated by a blower system which blower system can be placed at a distance from the light source module and can be connected from the blower through a tube to a duct which directs an air stream towards the light source. By using a tube for the connection between the blowing unit and the actual place where air stream is to be used for cooling, it is possible to operate the blower in a place where the suction inlet for air into the blowing unit is a relatively cool place.

7 Claims, 6 Drawing Sheets

LIGHT SOURCE MODULE FOR A LIGHT FIXTURE

BACKGROUND OF THE INVENTION

1. Field of the Invention

The present invention relates to a light source module for a light fixture, comprising a light source, which light source is connected through a light source base, which light source module comprises cooling means for cooling the light source and the light source base, which light source module further comprises a dichroic reflector, where at least one heat sink surrounds the dichroic reflector and comprises a number of dishes, which dishes are formed to achieve air gaps there between, which air gaps between the dishes are directed mostly perpendicularly to a center axis for the light source module, which heat sink forms air gap between the heat sink and the dichroic reflector, the heat sink being open towards the air gaps between the dishes.

The present invention relates further to a method for generating an air stream for cooling a light source, by which method the air stream is generated in a radial blower, which blower comprises a rotating fan, where the fan generates an air stream mostly tangential to the rotating fan.

2. Description of Related Art

Reducing the pinch temperature of a light source base, at least with lamps having a filament, is very important. The filament is connected by electrically conductive means through the lamp closure and through the lamp base. Increasing temperature leads to an oxidation and corrosion of the electric conductors. This leads to a reduction of the lifetime of the lamp. Therefore, the temperature at the pinch must typically be reduced to a temperature below 450-500 degrees C.

U.S. Pat. No. 5,626,416 describes a lamp module apparatus comprising a reflector where a fan generates an air stream. The air stream surrounds a lamp base before the air stream splits up and continues into a space between an inner reflector and the lamp where another part of the air stream flows between the inner and an outer reflector. Infrared light generated by the lamp passes through the inner reflector towards the outer reflector where infrared light is partly absorbed and partly reflected. A part of the infrared light that is absorbed in the outer reflector is radiated again at lower frequencies and partly towards the lamp base. As a result, the lamp base might be heated to a temperature which is so high that it reduces the lifetime of the lamp.

U.S. Pat. No. 5,515,245 describes a light source housing which contains a light source where heat removal is provided by cooling fins and a heat filter supported in the light path, and where a portion of the light is reflected towards the cooling fins. The cooling fins surround the reflector, but infrared light passes through the reflector, and is absorbed in the cooling fins. At least some of the cooling fins conduct the absorbed heat towards the lamp base, which leads to an increase of the temperature in the lamp base. This can lead to a reduced lifetime of the lamp.

U.S. Patent Application Publication 2002/0129262 A1 describes a light projector which includes an elliptical reflector, a first spherical retro-reflector, the first retro-reflector having an first aperture formed therein, the first aperture having a first diameter and a first center-point, a second spherical retro-reflector located between the elliptical reflector and the first retro-reflector, the second retro-reflector having a second aperture formed therein, the second aperture having a second diameter and a second center-point, the second diameter smaller than the first diameter, the first and second center-points lying along a common axis, and a light source, the light source located at a foci of the elliptical reflector, the light source lying along the common axis, the elliptical reflector reflecting light emitted by the light source, the reflected light passing through the first and second apertures, the first and second retro-reflectors being positioned so as to reflect light emitted by the light source back towards the light source. Also provided is a light projector that includes a light source projecting a beam of light; and an optical element movable between a first position in which the beam of light does not impinge upon the optical element, a second position in which substantially all of the beam of light impinges upon the optical element, and a plurality of intermediate positions in which a portion of the beam of light impinges upon the optical element, wherein the optical element is comprised of a plurality of radially sectioned sub-elements.

This patent application describes cooling fins, which cooling fins are connected mechanical towards the reflector, and which cooling fins surrounds the reflector. No air gap is present between the reflector and the cooling fins so that no airflow is possible between the reflector and the cooling fins. Only limited convection air-cooling takes place between the dishes.

German Utility Model DE G 86 20 537.4 describes a lamp which comprises a flexible light conducting material which could be a number of glass fibers which is used for transmitting light from a light source up to where light is to be emitted probably over a table. In this lamp, a light source is placed in a type of cavity formed in a stack of cooling dishes. The form of the cooling dishes shows that a reflector can be placed in the cavity. The reflector probably has a prefixed lamp bulb placed inside the reflector which integrated unit has a base where the lamp connections are pressed into a socket. The whole light source with the reflector and the source are placed in an air stream generated by a blowing means which blows air along the dishes.

This invention is probably highly efficient for a light source used, e.g., at a writing table. However, at a writing table, it is probably also critical that the cooling means are operating continuously. This will always lead to noise which will disturb people working at the desk. No attempts are made in the German document in the direction of reducing temperature in the light source base.

International Patent Application Publication WO 2005/095853 relates to a light source module comprising a light source, which light source module comprises a cooling means for cooling the light source base, which light source module further comprises a dichroic reflector, where at least one heat sink surrounds the dichroic reflector. The light source module comprises at least a first heat sink, which first heat sink comprises a number of dishes, which dishes are formed to achieve air gaps there between and which have at least one opening for the dichroic reflector. The dishes are placed radially around the dichroic reflector, and air gaps between the dishes are directed mostly perpendicularly to a center axis of the light source module. As a result, it is achieved that most of the infrared light, which is radiated in the direction of the dichroic reflector is absorbed in the dishes of the heat sink, and because the direction of the dishes is perpendicular to the main axis of the lamp module, the dishes conduct the heat radially towards the outer surface of the dishes.

U.S. Pat. Nos. 7,175,317 and 6,578,991 concern a system and method for cooling a bulb of a type that requires cooling in one part, but not in others. A deflector assembly is coupled, through a reflector, to the bulb to cool only one part.

SUMMARY OF THE INVENTION

A principal object of the present invention is to achieve highly effective cooling of a lamp in a light fixture or a projector. A further object of the invention is to cool the electric lamp connection to a temperature lower than the temperature of the light source.

This can be achieved by a light source for a light fixture, comprising a light source, which light source is connected through a light source base and has cooling means for cooling the light source and the light source base, a dichroic reflector, at least one heat sink surrounding the dichroic reflector, the heat sink is formed of a number of dishes, which dishes have air gaps formed therebetween, which air gaps are directed mostly perpendicularly relative to a center axis of the light source, and an air gap is formed between the heat sink and the dichroic reflector, if the light source is further modified by the provision of a blower system which generates at least one forced air stream and can be placed in the light fixture housing and connected through a tube that ends in a duct for directing the air stream towards the light source.

By using a tube for the connection between the blowing unit and the actual place where the air stream is to be used for cooling, it is possible that the blowing system can be operating in a place where it is possible for the suction air inlet into the blowing unit can be placed in a relatively cool place. This leads to the blowing of air with a temperature as low as possible. Especially, if blowing means are placed approximately in the area close to a light source, the temperature of the suction air into a blowing system can be relatively high which will decrease the efficiency of the cooling system. Especially in a light fixture, it can be important that the suction takes place in the front end of the projector because the suction air can result in further cooling of other optical components. This could be, e.g., gobos or it could be color flags used for changing the color of the light. Suction in these areas will lead to an intake of outside air into the projector which leads to further cooling of these components. Moving the blowing units forward in a light fixture also leads to a situation where the physical space for placing the blowing units is available. Near the light source, there will most probably be a reflector and there is also a need for a large heat sink close to the light source and close to the projector.

By using the tube, it is possible to direct an air stream directly to where it is to be used. This can lead to a reduction of the total airflow in a light fixture which further can reduce the noise generated by the airflow.

It is preferred that at least one forced air stream is directed towards the light source base. One of the most critical places in a light source for cooling is the light source base. Increasing temperature in the light source base can lead to an oxidation of the electronic connections. Oxidation of the electric lines leading to the inner of the light source will reduce the lifetime of a light source up to 50%. Therefore, if effective cooling is achieved in the light source base, this alone can lead to a highly increasing lifetime of the light source. Increasing the lifetime of light source in the light fixture is rather important because it is rather complicated to change a light source in a light fixture in operation placed high over a stage. Therefore, it is important to increase the lifetime of the light source.

It is also preferred that at least one forced air stream is directed towards the light source electric top connection. There are different types of light sources. One widely used light source has electric connections at both ends of the light source itself. This can lead to a relatively long electric connection which is made through glass in order to keep the connection airtight. However, also in light sources having top and bottom electric connections, it is important also to cool the top connection of the light source as such. In a preferred embodiment of the invention, at least two oppositely directed forced air streams are directed towards the light source base, where the at least two opposite directed forced air streams are directed towards the light source top electric connection. By using more opposite directed forced air streams, it is possible at the places in the light fixture where cooling is to be achieved to generate a turbulent airflow. Blowing at the light source base from at least two different directions will lead to a very turbulent airflow around the light source base. Blowing from different directions towards the top connection of a light source can lead to a turbulent airflow at the top connection, but also turbulent airflow around the light source as such. This can lead to a cooling of the inner of the reflector. The light source base can be placed in a cavity, which cavity comprises at least two opposite directed ducts for forced air, which cavity comprises an outlet connected towards the inner of the reflector and the air gap between the dichroic reflector and the dish-shaped heat sink. Blowing air from different directions into a cavity below the reflector will lead to a turbulent flow in that cavity. This cavity will then result in turbulent airflow in the air gap between the reflector and the heat sink. This turbulent flow can lead to a more effective cooling of also the heat sink. This is achieved because the turbulent airflow will probably flow out in the openings in the dish-formed heat sink.

The light source module can comprise at least one heat filter in the light path, which heat filter reflect infrared light towards the heat sink. Thus, the light beam which contains infra red light, which otherwise could lead to heat generation in further optical components, such as gobos or color filters, is prevented.

The air gaps between the dishes forming the heat sink can comprise a light trap for collecting infrared radiation. It is important that infrared light is collected at the heat sink and not radiated through the heat sink to the outside of the light source. By using the light trap infrared light, will hit the light trap and the only infrared light that is leaving the heat sink is infrared light that has been multiplied reflected at the inner walls of the dishes. These multiplied reflections will reduce the energy content of the infrared light to an acceptable level.

The forced air streams are directed by mostly conical ducts for increasing the velocity of the air stream leaving the ducts. By using conical ducts, it is possible to increase the velocity of the air and also concentrate the airstream in the direction towards, for example, the light source socket. If, for example, two high-speed airstreams are directed towards the same point around the light source, a turbulent airflow will be generated where the airstreams meet. This turbulent airflow will increase the cooling effect, primarily in the area inside the reflector or in the cavity that is provided around the light source base.

It is preferred that the outlet opening in the radial blower has a reduced opening area for avoiding air from streaming in a direction towards the wall of an outlet tube, that the outlet tube has an outlet opening with essentially the same open area as the open area of the radial blower, that the tube ends in a duct directed towards a light source. Thus, the noise generated in the blower is not transmitted to the light source. Surprisingly, the pressure at the outlet of the blower is increasing.

In another embodiment, the light source module can comprise a light source and a light source base, where a heat sink conducts the heat mostly into a radial direction towards the outside of the light source module by a heat sink formed of dishes, where the dishes are directed essentially perpendicular to the center axis of the light source module, where the light source module comprises an air gap between the dichroic reflector and the heat sink, where the said air gap between the dichroic reflector and the heat sink is open for air flow towards the air gaps between the dishes, where the light source base is placed in a housing, which housing surrounds the light source base, from which housing heated air flows through an outlet towards an air gap between the dichroic reflector and the heat sink, where blowing means generates at least one forced air stream, which blower means generates an airstream from the light fixture housing, which airstream is blown through a tube and a duct in a direction towards the light source. Using tubes and ducts, it is possible to direct the airflow directly towards the light source and the light source base where the critical temperature occurs.

In a further embodiment for the invention at least two blowing means generate airstreams, the speed of the blowing means are regulated by regulation means, the speed of the blowing means are adjusted independently, and the blowing means are adjusted at least in some time periods to operate at different speed.

By changing the speed of the blowing means, the turbulent airflow generated where airstreams meet will be very different. By changing the speed of the air, the most turbulent volumes inside the reflector or the cavity below the reflector will change all the time and the cooling effect will be increased. By changing the speed of the airstreams, it is totally avoided that some areas behind the light source are heated because the local airflow areas are reduced. Changing the speed of the airflow can increase the cooling effect without increasing the power required for cooling.

DETAILED DESCRIPTION OF THE INVENTION

Figure 1:
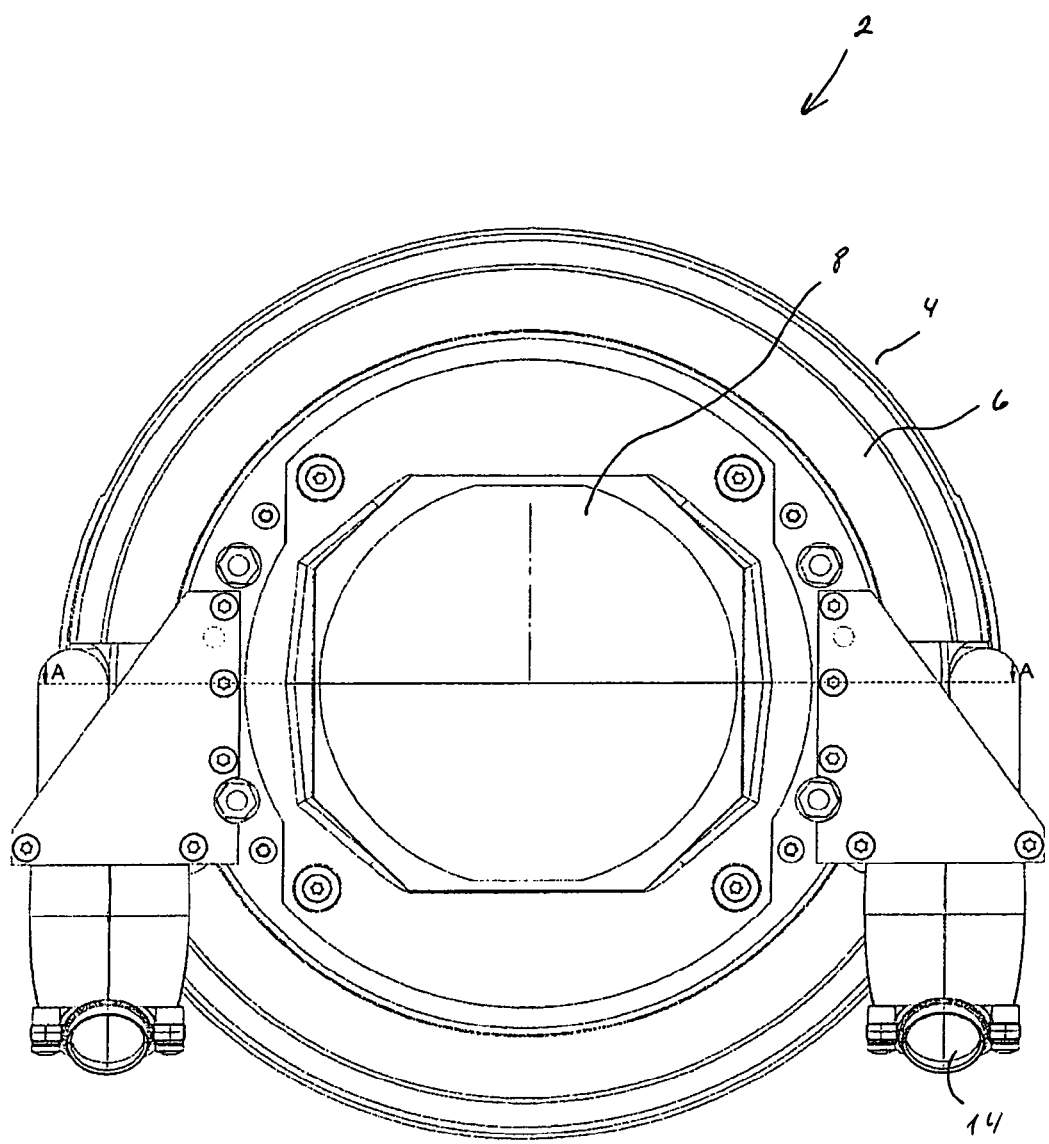
FIG. 1 shows a light source module seen from the front.

FIG. 1 shows a light source module 2 seen from the front. The light source module 2 comprises a housing 4 which has a conical side area 6 and an infrared reflecting optical filter 8. Furthermore, air inlet tubes 14 are indicated.

Figure 2:
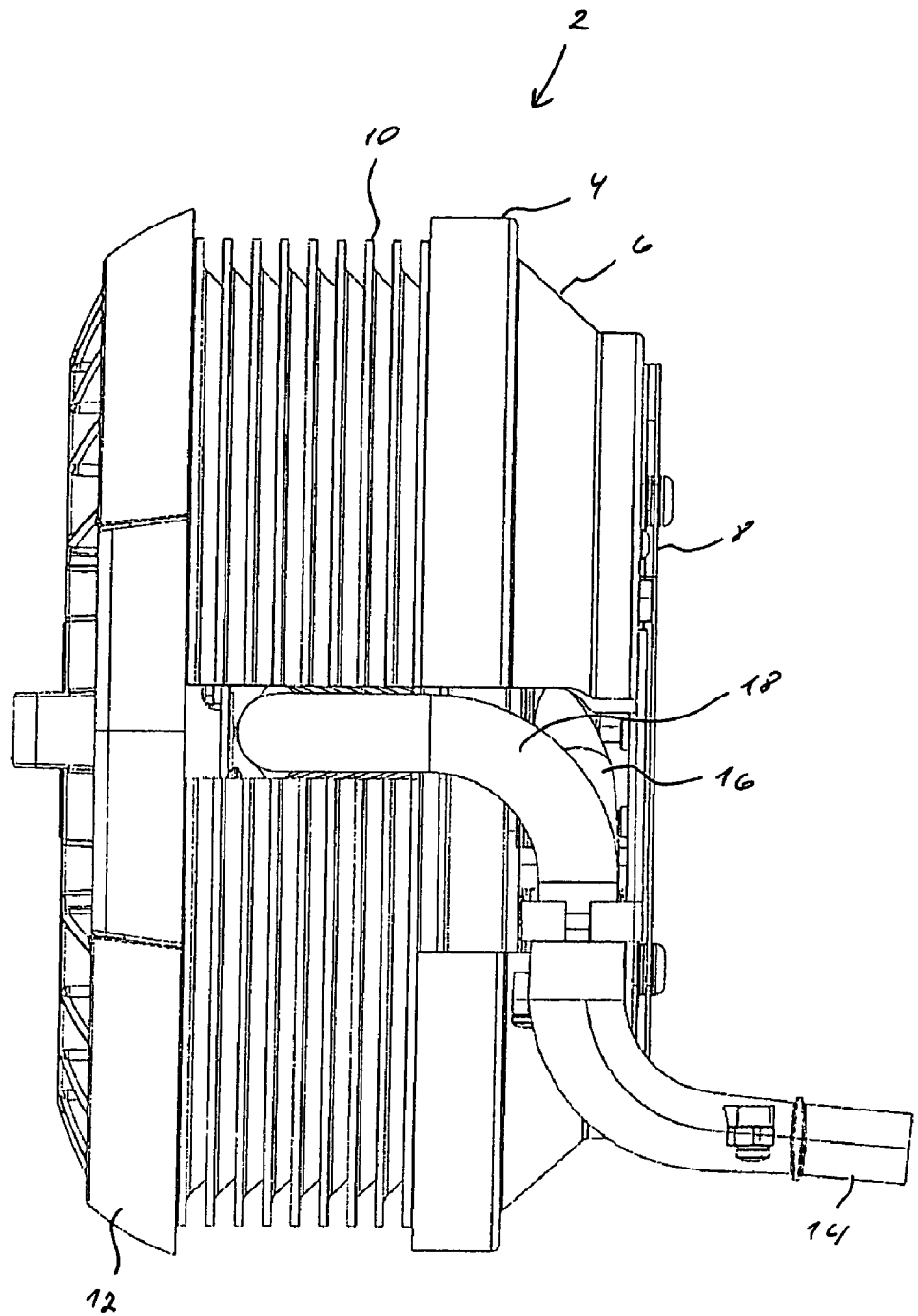
FIG. 2 shows a light source module for a light fixture seen from the side.

FIG. 2 shows the light source module 2 for a light fixture seen from the side. In this figure, the housing 4, the conical part 6 and the infrared optical filter 8 are also indicated. Furthermore, dishes 10 and a housing 12 for the light source base are indicated. FIG. 2 also shows a connection tube 14 for an air inlet which continues into a manifold that divides into tubes 16, 18.

Figure 3:
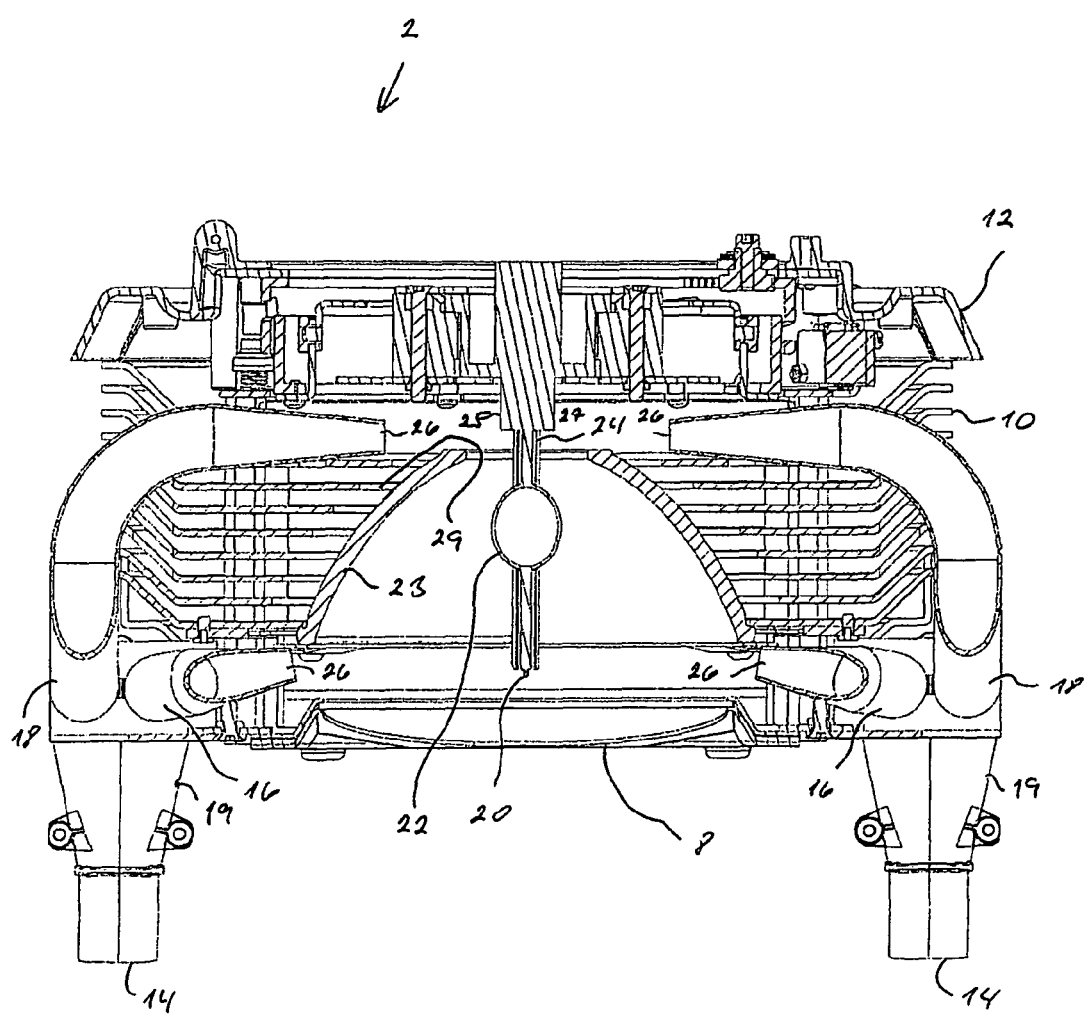
FIG. 3 is a sectional view of the light source module.

FIG. 3 shows a sectional view of the light source module 2. The light source module comprises the same components as previously described, but especially in this figure the infra red filter 8 is indicated. Furthermore a heat sink is shown that is formed of the dishes 10 and the housing for the light source base 12. The air inlet 14 is also indicated. These air inlets 14 are connected to a manifold 19 towards the tubes 16 and 18. The light source 22 has a top connection 20 and a connection 24 connected in the light source base 25. The light source base 25 is placed in the cavity 27 in which cavity 27 ducts 26 are indicated. Additional ducts 26 are directed towards the top connection 20 of the light source. Also, an opening 29 is shown that is provided between the inner edges of the dishes 10 and the reflector 23.

In operation, air generated from blowing means streams through the tubes 14 and manifolds 19 into the tubes 16, 18, and then into the ducts 26. The tube 18 leads to the ducts 26 in the cavity 27. In cavity 27, two airstreams meet resulting in a turbulent airflow in the cavity 27. This results in very effective cooling at the light source base and also at the light source electrical connection at 24. The air flowing into the cavity 27 is lead partly into the space inside the reflector 23 and partly through the opening 29 between the dishes 10 and the reflector 23. In both these ways to the outside, the airflow will be turbulent. Further, the air that flows through the tubes 16 to the ducts 26 will be directed towards the top connection of the reflector. The air will meet near the top connection 20 and this leads to a turbulent air flow in the interior of the reflector 23. This turbulent flow in the interior of the reflector is further accelerated in its velocity because the air inside the reflector expands due to the rapidly increasing temperature of the air. Therefore, a strong airflow is generated outside the interior of the reflector 23. As a result, a highly effective cooling of the light source 22 is achieved.

Figure 4:
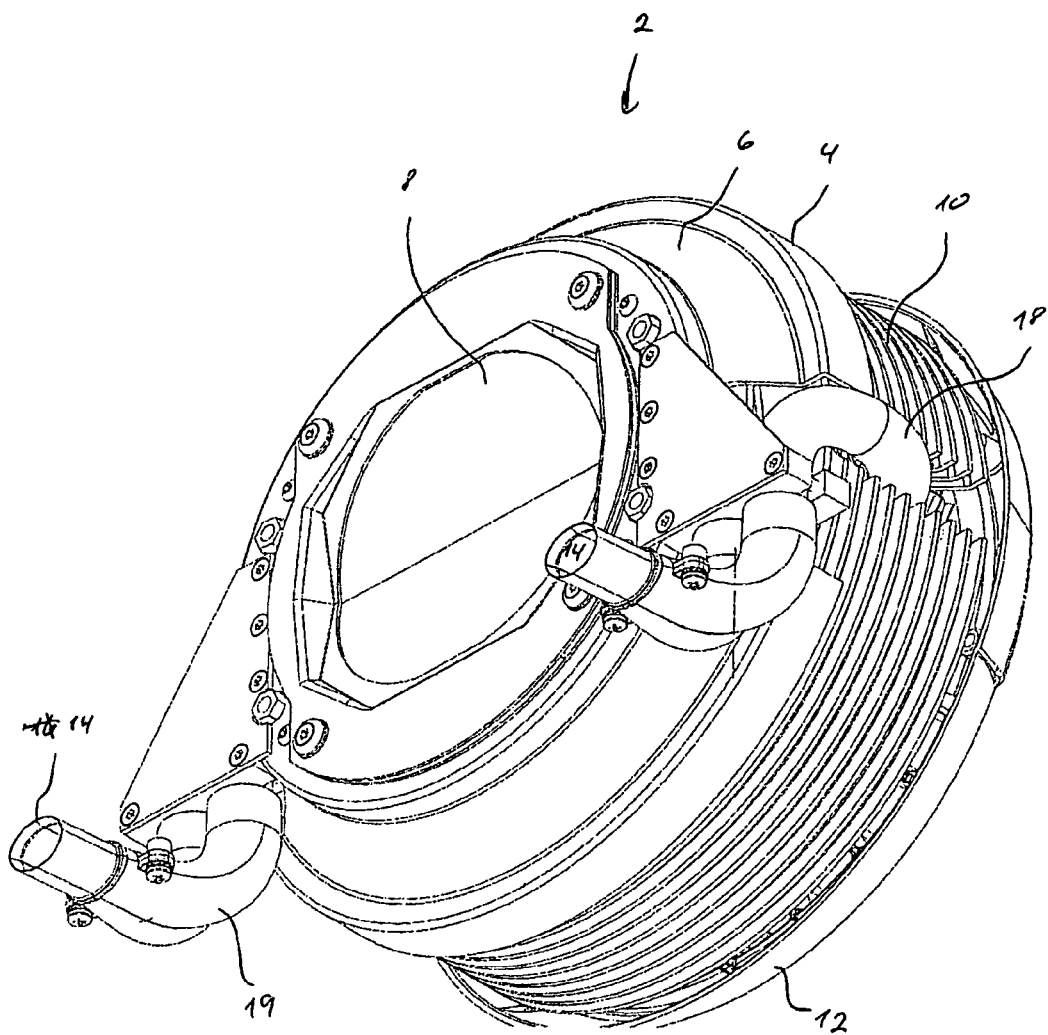
FIG. 4 is a perspective view of the light source module.

FIG. 4 is a perspective view of the light source module 2 with the same elements as previously mentioned.

Figure 5:
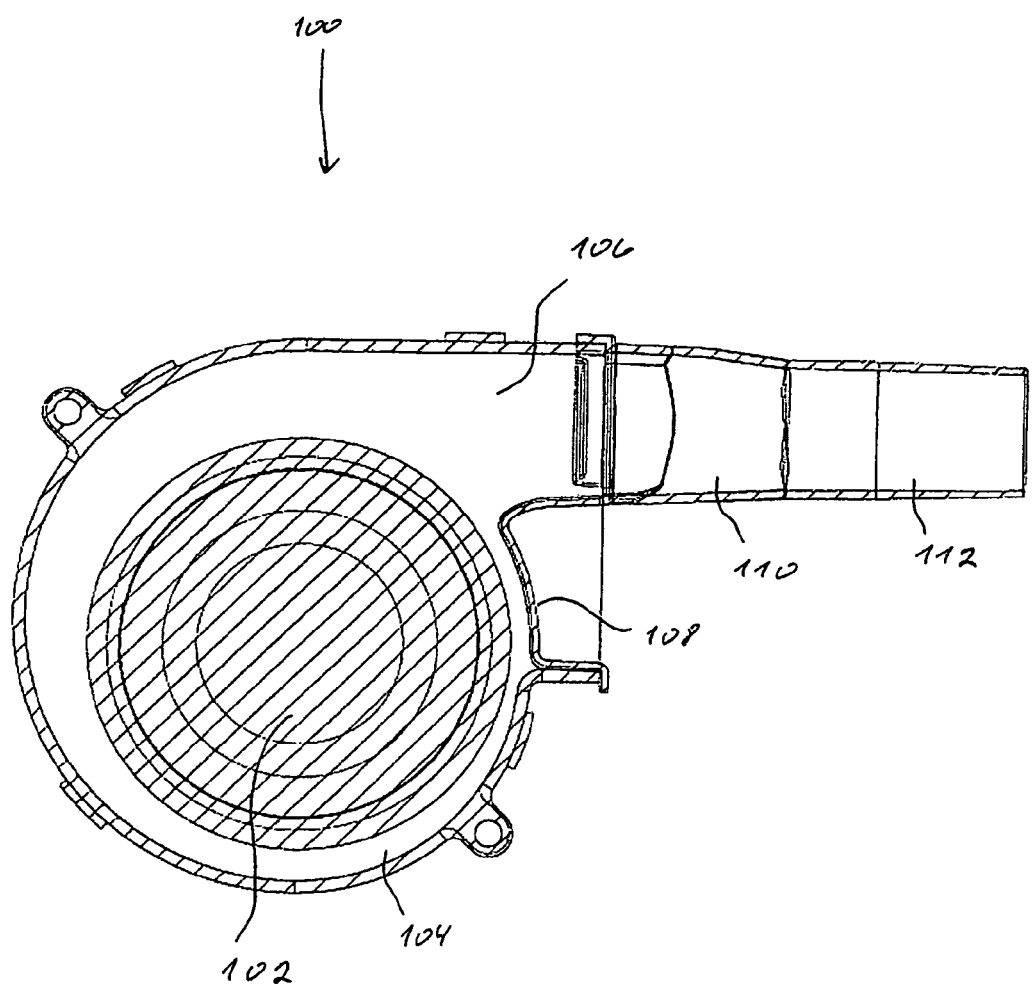
FIG. 5 is a sectional view of a blowing unit.

FIG. 5 is a sectional view of a blowing unit 100 comprising a rotating blower 102 in a housing 104. The diameter of an outlet 106 is reduced by an attachment 108 that reduces the outlet 106 to essentially the same open area as the ducts 110, 112.

Reducing the outlet opening of the radial blower results in that the air leaving through the opening 106 has a mostly laminar flow. This is simply because the air leaving the rotating blowing wheel 102 leaves in an essentially tangential direction. The attachment 108 leads to a situation where the air flowing through the outlet 106 travels mostly in the direction towards the duct 112. This reduces the noise that is generated in the blowing unit 100. However, surprisingly, it also results in a much higher pressure at the outlet.

Figure 6:
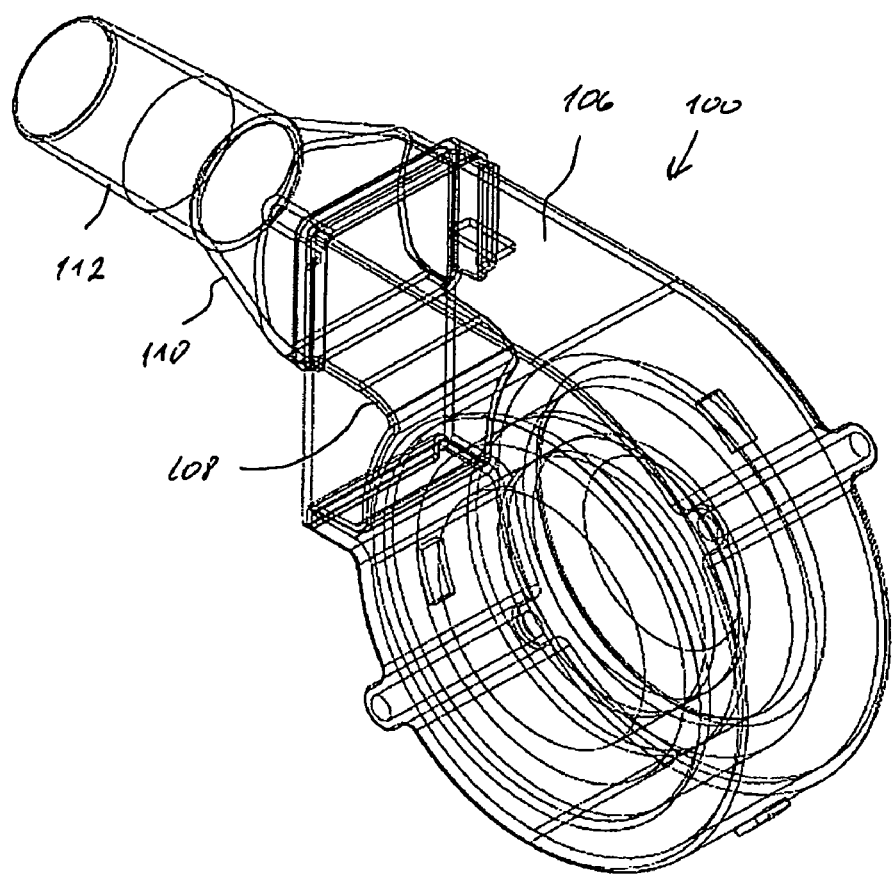
FIG. 6 is a perspective outline view of the blowing unit.

FIG. 6 is a perspective view of the same blowing unit 100 as is shown in FIG. 5, but now shown as an open outline.

What is claimed is:
1. A light source module for a light fixture, comprising:
a light source base,
a light source connected to the light source base,
cooling means for cooling the light source and the light source base,
a dichroic reflector,
at least one heat sink which surrounds the dichroic reflector and is formed of a number of dishes with air gaps between the dishes that are directed essentially perpendicular to a center axis of the light source module and with an air gap between the heat sink and the dichroic reflector,
wherein the cooling means comprises a blower system for generating at least one forced air stream, the blower system being located at a distance from the light source, reflector and at least one heat sink and being connected thereto through at least one tube which ends in ducts that direct the at least one forced air stream in a direction towards at least the light source;
wherein the ducts that direct the at least one forced air stream towards the light source direct the air stream toward a top electrical connection of the light source; and
wherein at least two oppositely directed forced airstreams are directed toward the light source base, and wherein at least two oppositely directed forced air streams are directed toward the light source electric top connection.

2. A light source module A light source module for a light fixture, comprising:
- a light source base,
- a light source connected to the light source base,
- cooling means for cooling the light source and the light source base,
- a dichroic reflector,
- at least one heat sink which surrounds the dichroic reflector and is formed of a number of dishes with air gaps between the dishes that are directed essentially perpendicular to a center axis of the light source module and with an air gap between the heat sink and the dichroic reflector,
- wherein the cooling means comprises a blower system for generating at least one forced air stream, the blower system being located at a distance from the light source, reflector and at least one heat sink and being connected thereto through at least one tube which ends in ducts that direct the at least one forced air stream in a direction towards at least the light source;
- wherein the ducts that direct the at least one forced air stream towards the light source direct the air stream toward a top electrical connection of the light source;
- wherein the ducts that also direct at least one forced air stream towards the light source base and
- wherein the light source base is placed in a cavity into which open at least two oppositely directed ducts for forced air, and wherein said cavity has an outlet connected towards the interior of the reflector and towards the air gap between the dichroic reflector and the heat sink.

3. A light source module according to claim 2, further comprising at least one heat filter in a light path from the light source, which heat filter reflects infrared light towards the heat sink.

4. A light source module according to claim 2, wherein the air gaps between the dishes forming the heat sink form a light trap for collecting infrared radiation.

5. A light source module according to claim 2, wherein the ducts have an essentially conical shape for increasing the velocity of the air stream leaving the ducts.

6. Method for cooling a light source module with air streams, the light source module comprising a light source base, a light source connected to the light source base, cooling means for cooling the light source and the light source base, a dichroic reflector, at least one heat sink which surrounds the dichroic reflector and is formed of a number of dishes with air gaps between the dishes that are directed essentially perpendicular to a center axis of the light source module and with an air gap between the heat sink and the dichroic reflector, comprising the steps of:
- generating an inlet forced air stream by a blower of the cooling means at a distance from the light source, reflector and at least one heat sink,
- directing said inlet forced air stream through at least one tube which ends in ducts that directed air therefrom in a direction towards at least the light source;
- wherein oppositely directed air streams are directed toward an electrical connection of the light source so as to generate a turbulent air flow around the electric connection of the light source in said directing step.

7. Method for cooling a light source module by an air stream according to claim 6, wherein at least two blowing means generate air streams, wherein the speed of the at least two blowing means are adjusted independently, and wherein the at least two blowing means are adjusted to operate at different speed at least during some time periods.

* * * * *